(12) United States Patent
Oskooei

(10) Patent No.: US 8,573,516 B2
(45) Date of Patent: Nov. 5, 2013

(54) NOZZLE DESIGN TO REDUCE FRETTING

(71) Applicant: Pratt & Whitney Canada Corp., Longueuil (CA)

(72) Inventor: Saeid Oskooei, Toronto (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 13/648,574

(22) Filed: Oct. 10, 2012

(65) Prior Publication Data

US 2013/0263603 A1  Oct. 10, 2013

Related U.S. Application Data

(62) Division of application No. 12/389,631, filed on Feb. 20, 2009, now Pat. No. 8,308,076.

(51) Int. Cl.
*B05B 1/30* (2006.01)
(52) U.S. Cl.
USPC ........................................ 239/565; 239/586
(58) Field of Classification Search
USPC ......... 239/589, 590.5, 597, 565, 586, 533.12, 239/584, 598
See application file for complete search history.

(56) References Cited

U.S. PATENT DOCUMENTS

| | | |
|---|---|---|
| 5,540,547 A | 7/1996 | Cole |
| 5,996,352 A | 12/1999 | Coughlan et al. |
| 6,038,862 A | 3/2000 | Melman et al. |
| 6,141,968 A | 11/2000 | Gates et al. |
| 6,145,762 A | 11/2000 | Orloff et al. |
| 6,253,555 B1 | 7/2001 | Willis |
| 6,272,842 B1 | 8/2001 | Dean |
| 6,434,945 B1 | 8/2002 | Mandai et al. |
| 6,672,073 B2 | 1/2004 | Wiebe |
| 6,705,087 B1 | 3/2004 | Ohri et al. |
| 6,820,431 B2 | 11/2004 | McManus et al. |
| 6,886,346 B2 | 5/2005 | Sobieski et al. |
| 7,197,877 B2 | 4/2007 | Moraes |
| 7,316,117 B2 | 1/2008 | Ohri |
| 2007/0000228 A1 | 1/2007 | Ohri et al. |
| 2007/0039325 A1 | 2/2007 | Lehtinen et al. |

*Primary Examiner* — Davis Hwu
(74) *Attorney, Agent, or Firm* — Norton Rose Fulbright Canada LLP

(57) ABSTRACT

A method of designing a fuel nozzle of a gas turbine engine to reduce fretting thereof during use, including establishing an initial nozzle design, determining a first natural frequency of that design and a running frequency range of the gas turbine engine, and increasing a first transverse dimension of the stem member of the nozzle across a length of a portion thereof adjacent the inlet end until the first natural frequency of the nozzle is outside the running range, while a second transverse dimension of the portion remains at least substantially unchanged across the length thereof.

8 Claims, 4 Drawing Sheets

US 8,573,516 B2

NOZZLE DESIGN TO REDUCE FRETTING

CROSS-REFERENCE TO RELATED APPLICATIONS

The present application is a Divisional of U.S. patent application Ser. No. 12/239,264 filed Sep. 26, 2008, the entire content of which is incorporated herein by reference.

TECHNICAL FIELD

The application relates generally to a fuel nozzle for gas turbine engine and, more particularly, to such a fuel nozzle in which fretting is reduced.

BACKGROUND OF THE ART

Fuel nozzles generally include a stem portion having an inlet coupled to a fuel source and an outlet coupled to a spray tip assembly for spraying or atomizing fuel into the combustion chamber. The spray tip assembly is generally received through the combustor wall floating collar, and vibrations caused by the engine in use can cause friction between the spray tip assembly and the combustor wall floating collar, thus causing fretting of this element of the fuel nozzle. Fuel nozzles, or parts thereof undergoing fretting, generally need to be regularly replaced to compensate for this damage. Such replacements increase time and costs of maintenance of the engine.

SUMMARY

In one aspect, there is provided a method of providing a fuel nozzle of a gas turbine engine to reduce fretting thereof during use, the method comprising establishing an initial nozzle design for a one-piece stem member having an inlet end for connection to a fuel supply, an outlet end for connection to a spray tip assembly and a central portion extending between the inlet and outlet ends and including and at least one fuel conduit defined therethrough in communication with the inlet and outlet ends, the central portion including a section defined adjacent the inlet end and extending along only part of a length of the central portion, determining a first natural frequency of the initial nozzle design, determining a running frequency range of the gas turbine engine, increasing a first transverse dimension of the stem member across a length of said section until the first natural frequency of the fuel nozzle is outside the running frequency range while a second transverse dimension of said section remains at least substantially unchanged across the length thereof, the first and second transverse dimensions being defined along different directions extending perpendicularly to a longitudinal axis of the stem member, and providing the one-piece stem member including the section with the increased first transverse dimension and the at least substantially unchanged second transverse dimension.

In another aspect, there is provided a method of reducing fretting of fuel nozzles in a gas turbine engine, the method comprising selecting a first stem member of a fuel nozzle installed in the gas turbine engine, selecting a second stem member including at least one fuel conduit similar to that of the first stem member, the stem members each having an inlet end adapted to be connected to a fuel supply, an outlet end, a central portion extending between the inlet and outlet ends, and a section corresponding to only part of the central portion and adjacent the inlet end, at least the second stem member being made of a single piece, the second stem member having a first transverse dimension defined across a length of said section greater than that of the first stem member such that the fuel nozzle with the second stem member has a first natural frequency different than that with the first stem member and outside a running range of the gas turbine engine, the first and second stem members having similar or identical second transverse dimensions defined across the length of the section, the first and second transverse dimensions of each stem member being defined along different directions extending perpendicularly to a longitudinal axis thereof, and substituting the first stem member by the second stem member.

In a further aspect, there is provided a fuel nozzle for a gas turbine engine, the nozzle comprising a monolithic stem member having an inlet end with at least one inlet for connection to a fuel supply, an outlet end with at least one outlet for connection to a spray tip assembly, and a central portion extending between the inlet and outlet ends, the stem member having at least one fuel conduit extending therethrough in connection with the inlet end and the outlet end, the stem member having a longitudinal axis and first and second transverse axes defined at least substantially perpendicularly to the longitudinal axis, a first outer dimension of the central portion defined parallel to the first transverse axis increasing from a first point located between the inlet and outlet ends to a second point adjacent the inlet end, a second outer dimension of the central portion defined parallel to the second transverse axis remaining at least substantially constant between the first and second points.

DESCRIPTION OF THE DRAWINGS

Reference is now made to the accompanying figures in which.

DETAILED DESCRIPTION

Figure 1:
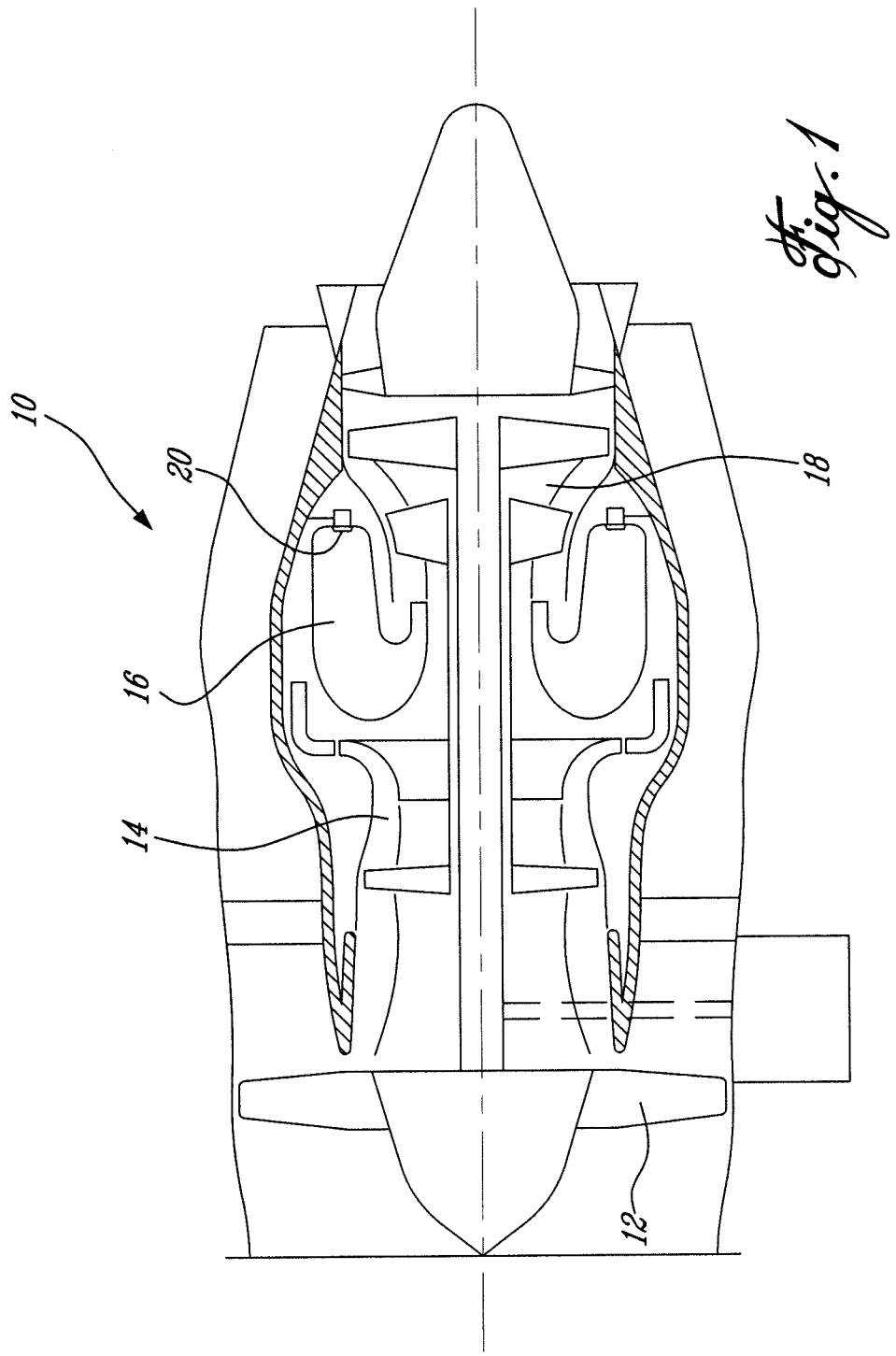
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases.

Figure 2:
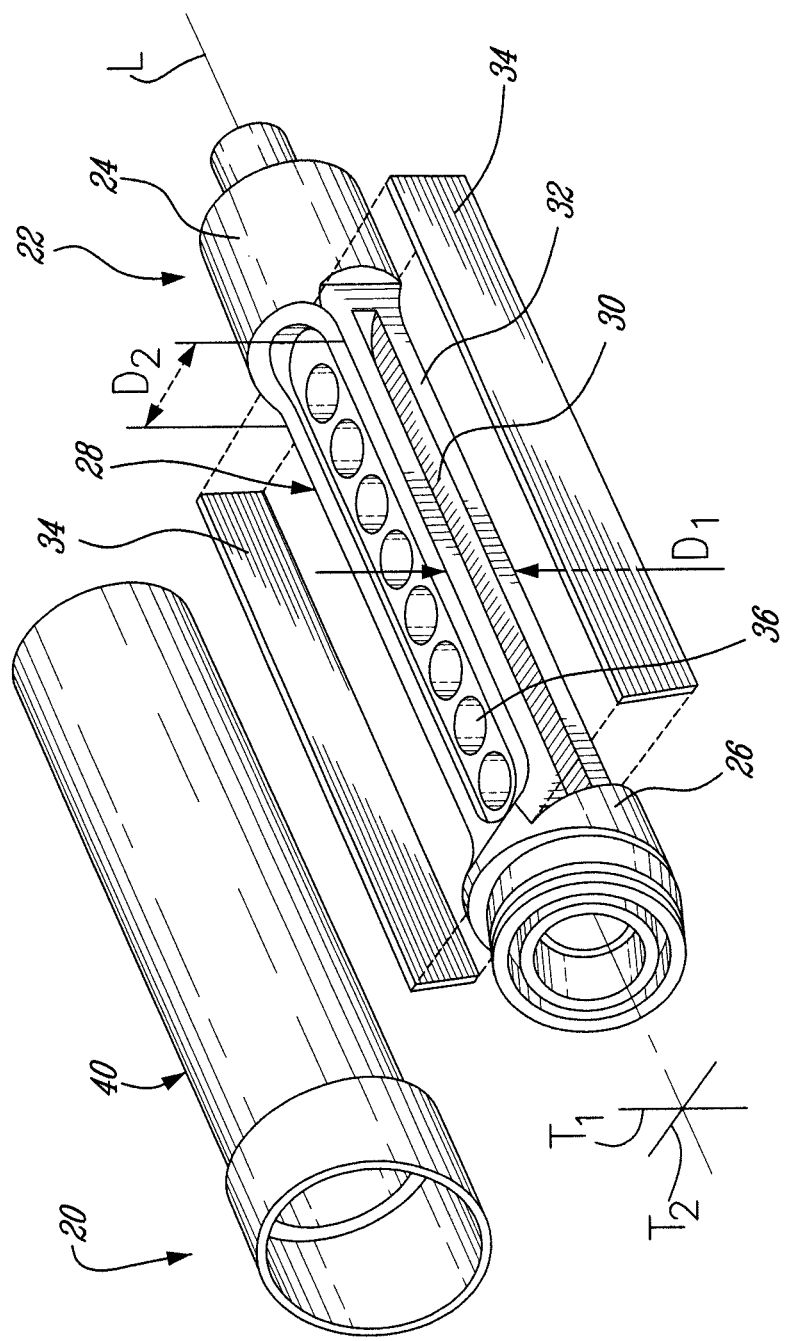
FIG. 2 is a perspective view of part of a fuel nozzle of the prior art.

FIG. 2 illustrates part of a fuel nozzle 20 of the prior art, for example such as shown in U.S. Pat. No. 6,141,968 which is incorporated herein in reference. The fuel nozzle 20 includes a stem member 22 having an inlet end 24 with one or more inlets for connection to a fuel supply (not shown), an outlet end 26 with one or more outlets for connection to a spray tip assembly (not shown), and a thinner central portion 28 extending therebetween. Longitudinal slots 30 (only one of which is visible) are defined on opposite outer surfaces 32 of the central portion 28 of the stem member 22, each slot 30 being in communication with the inlet and outlet ends 24, 26. Each slot 30 is sealed by a respective cover plate 34, such that each slot 30 defines a fuel conduit through the stem member 22. Longitudinally aligned holes 36 are defined in the central portion 28 of the stem member 22, i.e., between the two longitudinal slots 30, for lightening purposes. These holes 36 extend transversally with respect to the longitudinal axis L of the stem member 22. A tubular heat shield 40 is provided for protecting the stem member 22, and extends between outer surfaces of the inlet and outlet ends 24, 26.

In some instances, the first natural frequency of the fuel nozzle 20 partly illustrated in FIG. 2 may fall within the running frequency range of the gas turbine engine in which the fuel nozzle 20 is used, which is undesirable. As such, it is desirable to increase the first natural frequency of the fuel nozzle such that it is outside this running frequency range of the engine. As a common practice, the first natural frequency of the fuel nozzle should be higher than the engine rotor running frequency with an acceptable margin therebetween. Changing the first natural frequency of the fuel nozzle 20 away from the running range may advantageously reduce fretting, and as such the frequency at which portions of the fuel nozzle 20 need to be replaced.

Figure 3:
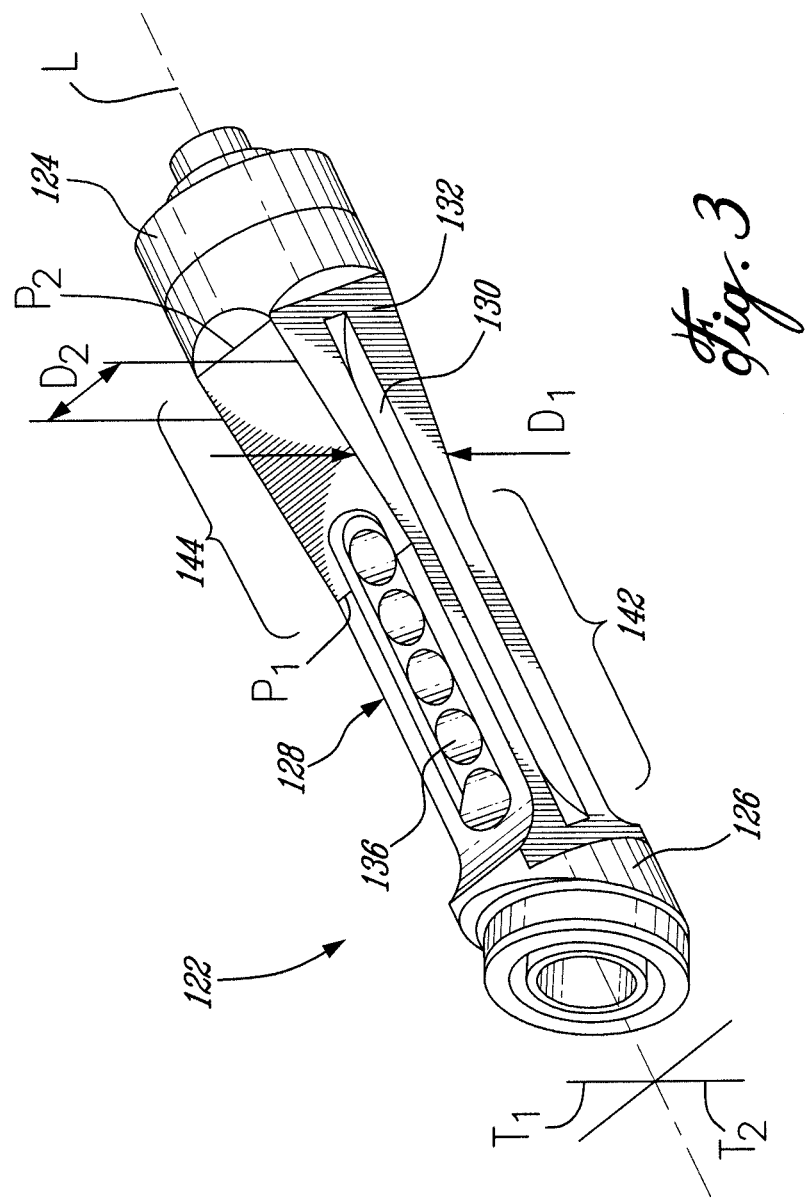
FIG. 3 is a perspective view of a modified stem member for a fuel nozzle which can be used in a gas turbine engine such as that shown in FIG. 1.

Reference is made to FIG. 3, where a modified stem member 122 for a fuel nozzle is shown. The modified stem member 122, when used in place of the first stem member 22, increases the first natural frequency of the fuel nozzle and as such brings the first natural frequency of the fuel nozzle outside of the running range of the engine.

The modified stem member 122 inlet and outlet ends 124, 126 similar or identical to that of the first stem member 22. The modified stem member 122 also includes a thinner central portion 128 interconnecting the inlet and outlet ends 124, 126. The modified stem member 122 is monolithic, i.e. formed as a unitary piece of material, and also includes longitudinal slots 130 (only one of which is visible) defined on opposite outer surfaces 132 of the central portion 128, each slot 130 being in communication with the inlet and outlet ends 124, 126. Each slot 130 is sealed by a respective cover plate (not shown), such that each slot 130 defines a fuel conduit through the modified stem member 122. When the modified stem member 122 is used in replacement of the first stem member 22, the two preferably include similar or identical fuel conduits defined therein through the slots 30, 130.

A first section or part 142 of the central portion 128 of the modified stem member 122, which is defined adjacent the outlet end 126, is similar or identical to that of the first stem member 22. A second section or part 144 of the central portion 128 of the modified stem member 122, which is defined between the first part 142 and the inlet end 124, has an increased mass with respect to that of the first stem member 22, thus causing an increased natural frequency for the modified stem member 122 and corresponding fuel nozzle.

Two different transverse axes T1, T2 can be defined perpendicularly to the longitudinal axis L of each stem member 22, 122. In the embodiment shown, the central portion of each stem member 22, 122 has an at least substantially rectangular cross section, the two transverse axes T1, T2 are defined perpendicularly to each other, and the second transverse axis T2 is defined perpendicularly to the opposed outer surfaces 32, 132 of the stem member 22, 122 receiving the cover plates. However, in an alternate embodiment, the transverse axes T1, T2 can be defined non-perpendicularly to each other.

Throughout the second part 148 of the central portion 128 of the modified stem member 122, a first outer dimension D1 defined parallel to the first transverse axis T1 is increased at a progressively larger rate from a first point P1 defined at the end of the first part 142 to a second point P2 defined adjacent the inlet end 124. As such, the second part 148 of the central portion 128 has a tapered shape, with a maximum thickness located at the second point P2 adjacent the inlet end 124, thus allowing the weight increase of the modified stem member 122 when compared to the first stem member 22 to be minimized for a given increase in first natural frequency. However, throughout the second part 148 of the central portion 128 of the modified stem member 122, a second outer dimension D2 defined parallel to the second transverse axis T2 remains at least substantially unchanged across the length thereof, and in a particular embodiment, is at least substantially constant across the length of the central portion 128. Increasing the outer dimension of the stem member along only part of its perimeter further minimizes the weight increase for a given increase in natural frequency.

By comparison, the first and second outer dimensions D1, D2 of the first stem member 22 of FIG. 2 are both at least substantially constant across the length of the central portion 28 of the stem member 22.

In a particular embodiment, the first outer dimension D1 of the modified stem member 122 is increased such that the second part 144 has an at least substantially triangular shape defined by flat tapered outer surfaces. In a particular embodiment, the first outer dimension D1 is increased at least substantially symmetrically with respect to the longitudinal axis L.

In a particular embodiment, the cover plates (not shown) sealingly connected to the modified stem member 122 are thicker than the cover plates 34 sealingly connected to the first stem member 22, for example having twice the thickness of the cover plates 34 received on the first stem member 22, to further increase the stiffness and the natural frequency of the fuel nozzle.

In a particular embodiment, the second part 144 of the central portion 128, where the thickness of the stem member 122 is increased, is optimized to provide the necessary frequency increase with minimum weight increase. In one example, the length of the second part 144 of the central portion 128 corresponds to less than half the length of the central portion 128 of the stem member 122.

The modified stem member 122 also includes longitudinally aligned holes 136 defined in the central portion 128 of the stem member 122 for lightening purposes; however these holes are omitted in most of the second part 144 of the central portion 128.

As such, upon designing a fuel nozzle for a particular gas turbine engine, the dimensions for a fuel nozzle 20 such as partly shown in FIG. 2 can be determined according to appropriate methods. A running frequency range for the specific gas turbine engine 10 is then determined. In the case where the first natural frequency of the nozzle 20 is within or too close to the determined running range, the first transverse dimension D1 of the second part 144 of the central portion 128 of the modified stem member 122 is increased across its length while keeping the second transverse dimension D2 at least substantially unchanged, as described above, until the first natural frequency of the fuel nozzle 20 reaches an acceptable value outside the running frequency range. This can be done according to an iterative process, verifying the first natural frequency of the fuel nozzle for example through experimentation, e.g. using strain gauge tests on fuel nozzles installed in the gas turbine engine, using adequate modeling software, etc.

Figure 4:
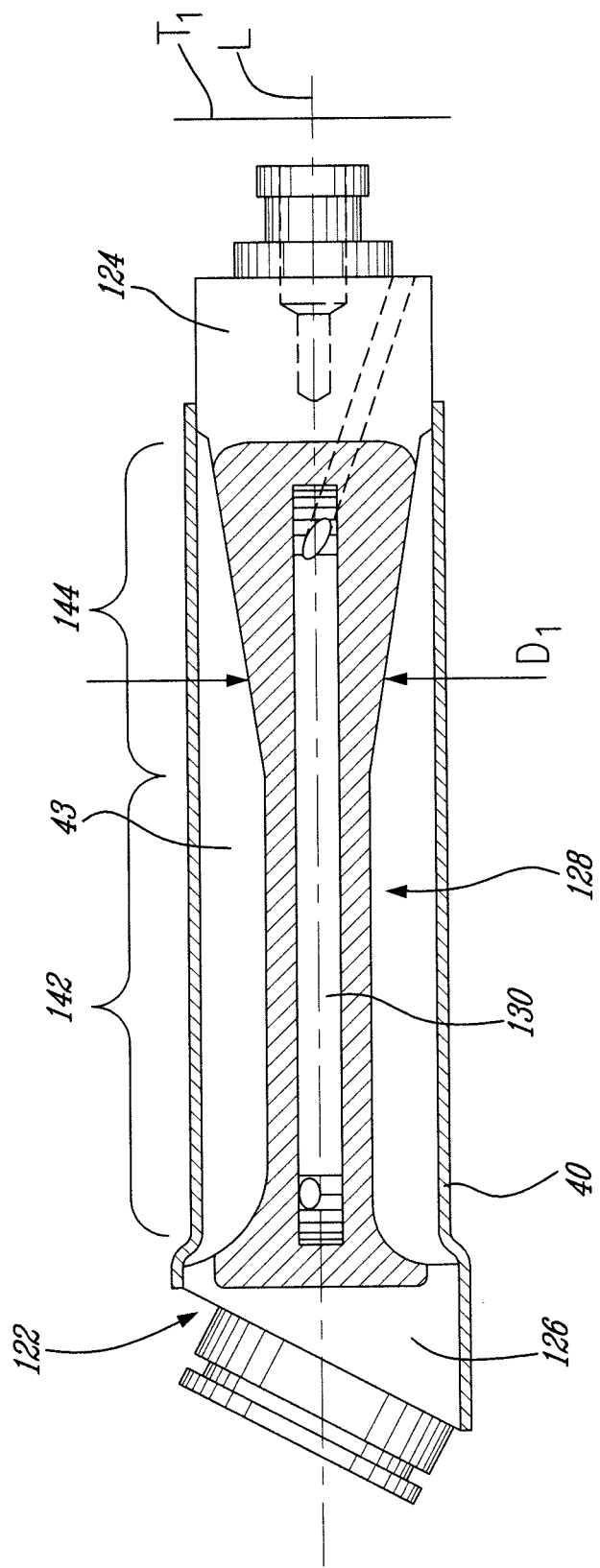
FIG. 4 is a side view of the stem member of FIG. 3 with a corresponding heat shield shown in cross-section.

Referring to FIG. 4, the increase of the first dimension D1 is preferably limited to allow the central portion 128 of the modified stem member 122 to remain contained inside the same envelope 43 defined by the heat shield 40 of the first stem member 22. In the embodiment shown, the heat shield 40 is tubular and extends between outer surfaces of the inlet and outlet ends 24, 26, and as such the increase of the first dimension D1 is limited such that the central portion 128 of the modified stem member 122 does not extend outwardly beyond the inlet and outlet ends 124, 126. As such, a same or similar heat shield can be installed around the modified stem member 122 when compared to the first stem member 22, and the modified and first stem members 22, 122 may appear identical once the heat shield 40 is installed.

The above description is meant to be exemplary only, and one skilled in the art will recognize that changes may be made to the embodiments described without departing from the scope of the invention disclosed. For example, the dimensions variations applied between the modified stem member 122 and the first stem member 22 can be similarly applied to different types of stem members, including, but not limited to, stem members having tubular fuel conduits defined therethrough, stem members having a different shape, and stem members which are integral with other portions of the fuel nozzle (e.g. the spray tip assembly). Still other modifications which fall within the scope of the present invention will be apparent to those skilled in the art, in light of a review of this disclosure, and such modifications are intended to fall within the appended claims.

The invention claimed is:

1. A fuel nozzle for a gas turbine engine, the nozzle comprising a monolithic stem member having an inlet end with at least one inlet for connection to a fuel supply, an outlet end with at least one outlet for connection to a spray tip assembly, and a central portion extending between the inlet and outlet ends, the stem member having at least one fuel conduit extending therethrough in connection with the inlet end and the outlet end, the stem member having a longitudinal axis and first and second transverse axes defined at least substantially perpendicularly to the longitudinal axis, a first outer dimension of the central portion defined parallel to the first transverse axis increasing from a first point located between the inlet and outlet ends to a second point adjacent the inlet end, a second outer dimension of the central portion defined parallel to the second transverse axis remaining at least substantially constant between the first and second points.

2. The fuel nozzle as defined in claim 1, wherein the first transverse dimension is increased at a progressively larger rate between the first and second points such as to obtain a flat tapered profile with a maximum located at the second point.

3. The fuel nozzle as defined in claim 1, wherein the first transverse dimension increases between the first and second points in an at least substantially symmetrical manner with respect to the longitudinal axis.

4. The fuel nozzle as defined in claim 1, wherein the first and second transverse dimensions are at least substantially perpendicular to one another.

5. The fuel nozzle as defined in claim 1, wherein the central portion includes at least one longitudinal slot defined in an outer surface thereof and sealed by a cover plate to define one of the at least one fuel conduits, the cover plate extending at least substantially perpendicularly to the second transverse axis.

6. The fuel nozzle as defined in claim 1, wherein a distance between the first point and the inlet end corresponds to less than half of a length of the central portion.

7. The fuel nozzle as defined in claim 1, wherein the stem member has an at least substantially rectangular cross-section, the first and second transverse axes being defined perpendicularly to one another, the second transverse axis being defined perpendicularly to opposed outer surfaces of the stem member.

8. The fuel nozzle as defined in claim 7, wherein the opposed outer surfaces each include a longitudinal slot defined therein in connection with the inlet and the outlet and sealed by a plate member to define one of the at least one fuel conduits.

* * * * *